US012709047B2

(12) United States Patent
Takano et al.

(10) Patent No.: US 12,709,047 B2
(45) Date of Patent: Aug. 18, 2026

(54) MOLD FOR INJECTION MOLDING AND INJECTION MOLDING SYSTEM

(71) Applicant: SEIKO EPSON CORPORATION, Tokyo (JP)

(72) Inventors: Hiroki Takano, Matsumoto (JP); Seijun Horie, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 121 days.

(21) Appl. No.: 18/931,134

(22) Filed: Oct. 30, 2024

(65) Prior Publication Data

US 2025/0135693 A1 May 1, 2025

(30) Foreign Application Priority Data

Oct. 31, 2023 (JP) ................................ 2023-186313

(51) Int. Cl.
*B29C 45/04* (2006.01)
*B29C 45/34* (2006.01)

(52) U.S. Cl.
CPC ............. *B29C 45/04* (2013.01); *B29C 45/34* (2013.01)

(58) Field of Classification Search
CPC ...... B29C 45/04; B29C 45/34; B29C 45/2602
See application file for complete search history.

(56) References Cited

U.S. PATENT DOCUMENTS 5,169,655 A * 12/1992 Von Holdt, Sr. ........ B29C 45/38 425/572
6,027,328 A * 2/2000 Herbst ............. G06K 19/07724 425/572
6,089,852 A * 7/2000 Lee ......................... B29C 45/32 425/588
2005/0205492 A1 * 9/2005 Yusa .................. B29C 45/1701 210/757

FOREIGN PATENT DOCUMENTS

JP 2013-204122 A 10/2013

* cited by examiner

*Primary Examiner* — Galen H Hauth
*Assistant Examiner* — Mohamed K Ahmed Ali
(74) *Attorney, Agent, or Firm* — Harness, Dickey & Pierce, P.L.C.

(57) ABSTRACT

A mold for injection molding includes a first mold where a gate opening is formed and a second mold moving due to mold opening in a mold opening direction, wherein the second mold includes a third mold, a fourth mold arranged between the third mold and the first mold in the mold opening direction, and a fifth mold arranged between the fourth mold and the first mold in the mold opening direction, the third mold and the fourth mold forming the cavity, the fourth mold having a passage, the fifth mold having a first penetration hole, the first mold has a recess at a surface facing the second mold, the fifth mold is arranged in the recess when mold closing is performed, and a groove penetrating the mold downward in the vertical direction is formed.

8 Claims, 11 Drawing Sheets

MOLD FOR INJECTION MOLDING AND INJECTION MOLDING SYSTEM

The present application is based on, and claims priority from JP Application Serial Number 2023-186313, filed Oct. 31, 2023, the disclosure of which is hereby incorporated by reference herein in its entirety.

BACKGROUND

1. Technical Field

The present disclosure relates to a mold for injection molding and an injection molding system.

2. Related Art

For example, JP-A-2013-204122 discloses a forming mold for metal powder injection molding having a plurality of gates to introduce a metal powder injection molding material into a cavity and a runner that couples a sprue and the gates.

JP-A-2013-204122 is an example of the related art.

When a mold for injection molding is closed, if a used molding material or the like is caught between two different molds, the molds are not accurately in contact with each other, posing a problem of molding failure.

SUMMARY

According to a first aspect of the present disclosure, a mold for injection molding is provided. This mold for injection molding is a mold for injection molding which has a plurality of molds and in which a cavity prescribing a shape of a product is formed, the mold for injection molding including: a first mold where a gate opening through which a molding material flows in is formed; and a second mold that moves due to mold opening in a mold opening direction which is a direction away from the first mold and perpendicular to a vertical direction, wherein the second mold includes a third mold, a fourth mold arranged between the third mold and the first mold in the mold opening direction, and a fifth mold arranged between the fourth mold and the first mold in the mold opening direction, the third mold and the fourth mold forming the cavity, the fourth mold having a passage through which the molding material passes from the gate opening toward the cavity, the fifth mold having a first penetration hole through which the molding material passes from the gate opening toward the passage, the first mold has a recess at a surface facing the second mold, the fifth mold is arranged in the recess when mold closing is performed, a space is formed between the third mold and the fourth mold, between the fourth mold and the fifth mold, between the fifth mold and the first mold, and between the fourth mold and the first mold in the mold opening direction by the mold opening, and a groove penetrating the mold downward in the vertical direction is formed at least at one of an opposite surface of at least one of the third mold and the fourth mold, an opposite surface of at least one of the fourth mold and the fifth mold, an opposite surface of at least one of the fifth mold and the first mold, and an opposite surface of at least one of the fourth mold and the first mold.

According to a second aspect of the present disclosure, an injection molding system is provided. This injection molding system is an injection molding system including the mold for injection molding according to the above aspect and an open-gate-type nozzle that ejects the molding material, wherein the molding material includes a metal powder, the fifth mold has a second penetration hole communicating with the passage, the first mold has a support part that is inserted in the second penetration hole and that supports the molding material filling an inside of the passage, and the support part has a third part with a cross-sectional area perpendicular to the mold opening direction having a first value and a fourth part with the cross-sectional area having a second value smaller than the first value, the third part being formed nearer to a distal end than the fourth part.

According to a third aspect of the present disclosure, an injection molding system is provided. This injection molding system includes: an injection molding device having the mold for injection molding according to the above aspect and a nozzle that ejects the molding material; a pedestal where the injection molding device is installed; and an accommodation unit arranged below the pedestal and accommodating the molding material which is disposed of, and a disposal hole leading to the accommodation unit is formed in the pedestal, at a position corresponding to a position below the groove.

BRIEF DESCRIPTION OF THE DRAWINGS

FIG. 13 illustrates a schematic configuration of an injection molding system according to a third embodiment.

FIG. 14 is a perspective view of a support part according to the third embodiment.

FIG. 15 is a cross-sectional view showing a schematic configuration of an injection unit.

DESCRIPTION OF EMBODIMENTS

A. First Embodiment

Figures 1, 2:
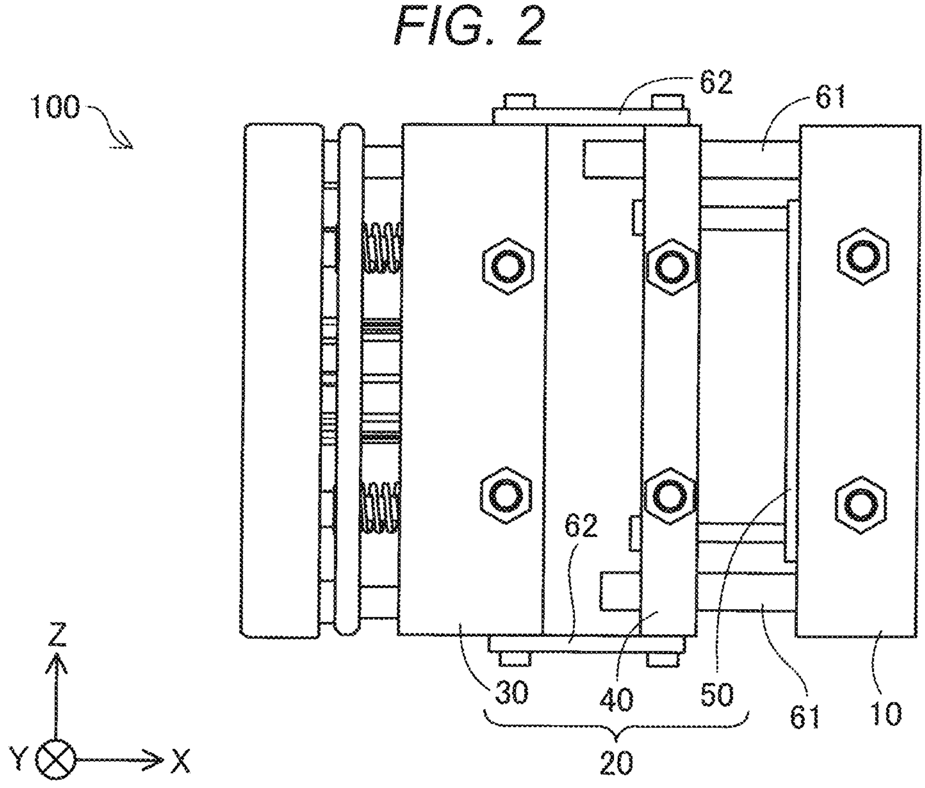
FIG. 1 is a side view of a mold for injection molding.
FIG. 2 is a side view of the mold for injection molding.
Figure 3:
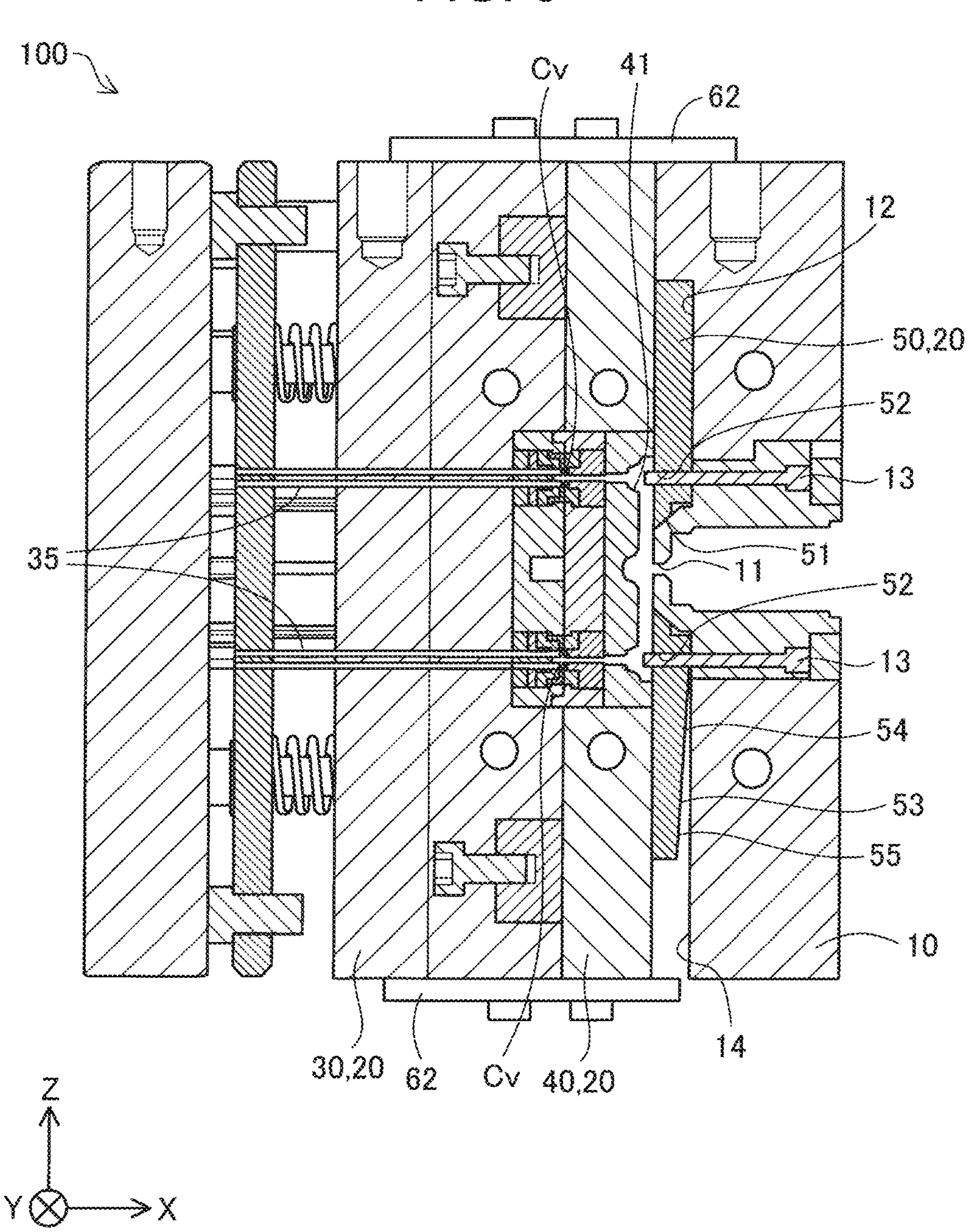
FIG. 3 is a cross-sectional view of the mold for injection molding, taken along a direction perpendicular to a vertical direction and a mold opening direction.
Figure 4:
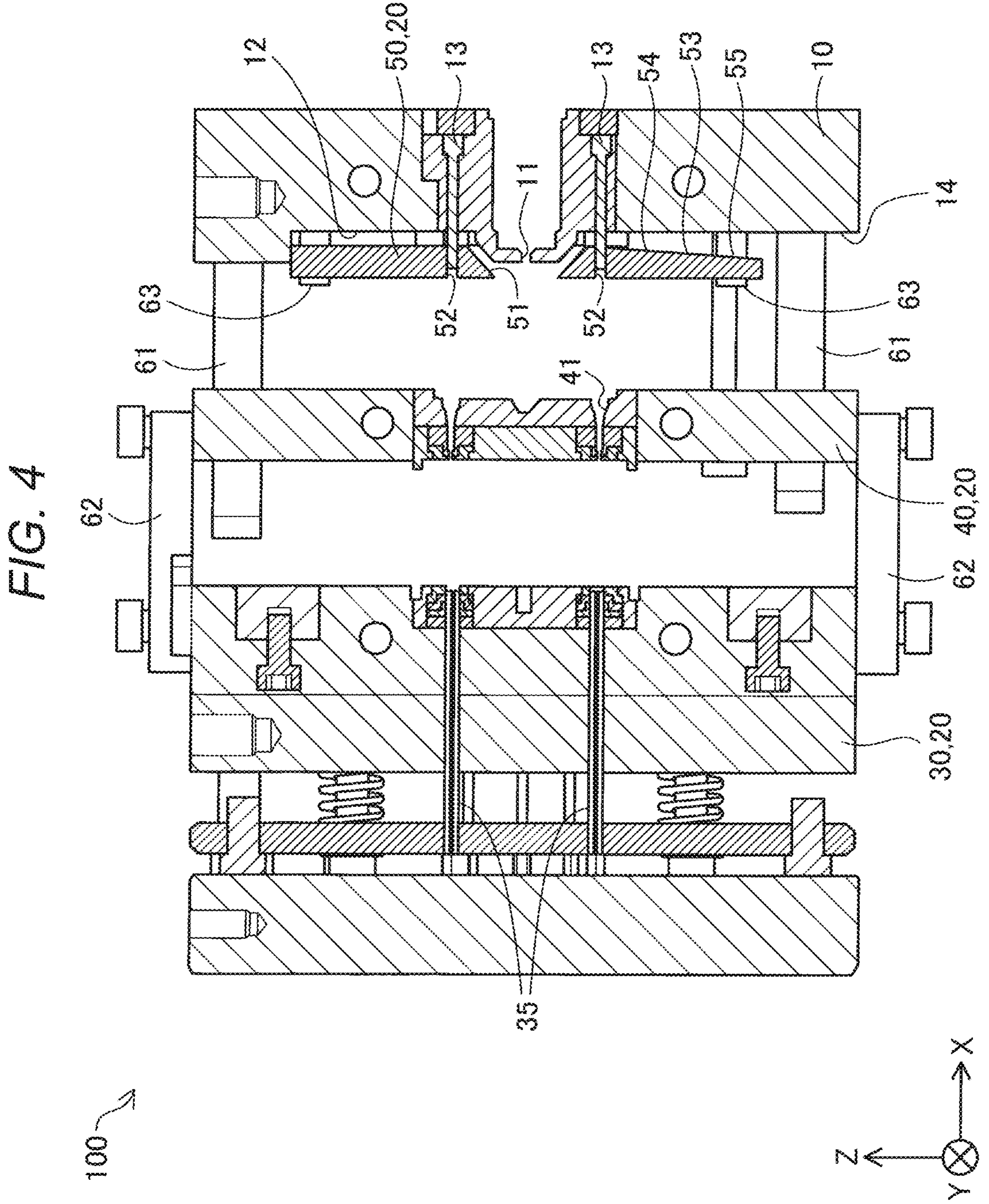
FIG. 4 is a cross-sectional view of the mold for injection molding, taken along a direction perpendicular to the vertical direction and the mold opening direction.

FIGS. 1 and 2 are side views of a mold for injection molding 100. FIGS. 3 and 4 are cross-sectional views of the mold for injection molding 100, taken along a direction perpendicular to a vertical direction and a mold opening direction, described later. FIGS. 1 and 3 show a state where all the molds provided in the mold for injection molding 100 are closed, and FIGS. 2 and 4 show a state where all the molds provided in the mold for injection molding 100 are opened. In FIGS. 1 to 4, arrows representing X, Y, and Z directions orthogonal to each other are shown. The X direction and the Y direction are parallel to a horizontal plane. The Z direction is a direction parallel to the vertical direction. The X, Y, and Z directions in FIGS. 1 to 4 and X, Y, and Z directions in the other illustrations indicate the same directions. To specify which side along a direction is indicated, a positive or negative sign is added to the indication of the direction, where "+" refers to a positive direction indicated by an arrow and "−" refers to a negative direction opposite to the direction indicated by the arrow.

The mold for injection molding 100 has a first mold 10 and a second mold 20. The second mold 20 moves in the mold opening direction when the mold opening of the mold for injection molding 100 is performed. The mold opening direction is a direction away from the first mold 10 and perpendicular to the vertical direction. The direction opposite to the mold opening direction is referred to as a mold closing direction. In this embodiment, the mold opening direction is the −X direction and the mold closing direction is the +X direction.

The second mold 20 has a third mold 30, a fourth mold 40, and a fifth mold 50. The fourth mold 40 is arranged between the third mold 30 and the first mold 10 in the mold opening direction. The fifth mold 50 is arranged between the fourth mold 40 and the first mold 10 in the mold opening direction. When the mold closing of the mold for injection molding 100 is performed, the third mold 30 and the fourth mold 40 come into contact with each other, the fourth mold 40 and the fifth mold 50 come into contact with each other, the fifth mold 50 and the first mold 10 come into contact with each other, and the fourth mold 40 and the first mold 10 come into contact with each other, as shown in FIG. 3. When the mold opening of the mold for injection molding 100 is performed, a space is formed between the third mold 30 and the fourth mold 40, between the fourth mold 40 and the fifth mold 50, between the fifth mold 50 and the first mold 10, and between the fourth mold 40 and the first mold 10 in the mold opening direction, as shown in FIG. 4.

The first mold 10 and the fourth mold 40 are coupled together by a first coupling member 61 fixed to the first mold 10 in such a way that the first mold 10 and the fourth mold 40 are spaced apart from each other at a predetermined distance due to the mold opening. The third mold 30 and the fourth mold 40 are coupled together by a second coupling member 62 in such a way that the third mold 30 and the fourth mold 40 are spaced apart from each other at a predetermined distance due to the mold opening. The first mold 10 and the fifth mold 50 are coupled together by a third coupling member 63 fixed to the first mold 10 in such a way that the first mold 10 and the fifth mold 50 are spaced apart from each other at a predetermined distance due to the mold opening.

The first mold 10 has a gate opening 11, a recess 12, and a support part 13. The gate opening 11 is a hole penetrating the first mold 10 in the mold opening direction. When molding of a product is performed using the mold for injection molding 100, a molding material flows in the gate opening 11. The recess 12 and the support part 13 will be described later. The product is also referred to as a molded article.

As shown in FIG. 3, when the mold for injection molding 100 is closed, the third mold 30 and the fourth mold 40 form a cavity Cv prescribing the shape of the product. The cavity Cv is a space having a shape corresponding to the shape of the product.

Figure 5:
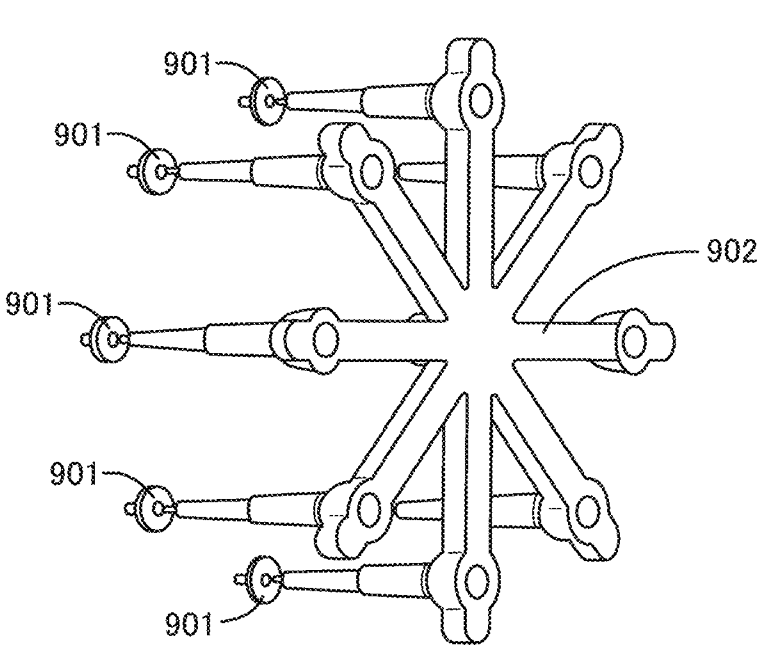
FIG. 5 shows an example of a product molded using the mold for injection molding, and the shape of a runner.

The fourth mold 40 has a passage 41 through which the molding material passes from the gate opening 11 in the first mold 10 toward the cavity Cv. The molding material flowing in from the gate opening 11 fills the passage 41 and the cavity Cv. In this specification, the molding material filling the passage 41 and solidified there is also referred to as a runner. FIG. 5 shows an example of a product 901 molded using the mold for injection molding 100, and the shape of a runner 902.

The fifth mold 50 has a first penetration hole 51 and a second penetration hole 52, which are holes penetrating the fifth mold 50 in the mold opening direction. The first penetration hole 51 is a hole through which the molding material passes from the gate opening 11 toward the passage 41. The second penetration hole 52 is a hole communicating with the passage 41 in the state where the fourth mold 40 and the fifth mold 50 are in contact with each other.

The support part 13 is a columnar member protruding in the mold opening direction from the first mold 10. In this embodiment, the cross-sectional area perpendicular to the mold opening direction, of the support part 13, is constant regardless of any position on the support part 13. The support part 13 is inserted in the second penetration hole 52 in the fifth mold 50 and supports the molding material filling the inside of the passage 41 in the fourth mold 40. That is, the support part 13 supports the runner 902. The support part 13 is provided in the first mold 10 in such a way that the distal end of the support part is located inside the passage 41 in the state where the mold for injection molding 100 is closed and that the distal end of the support part is accommodated inside the second penetration hole 52 in the state where the mold for injection molding 100 is opened.

In the mold opening of the mold for injection molding 100, first, the third mold 30 and the fourth mold 40 move in a unified manner in the mold opening direction in relation to the first mold 10. When the first mold 10 and the fourth mold 40 are spaced apart from each other at a predetermined distance, the first coupling member 61 stops the movement of the third mold 30 and the fourth mold 40 in the mold opening direction. At this point, the runner 902 is supported by the support part 13 and therefore remains on the side of the first mold 10. Thus, the runner 902 and the product 901 are separated from each other. Next, in the state where the fourth mold 40 is stationary, the third mold 30 moves in the mold opening direction in relation to the fourth mold 40. When the third mold 30 and the fourth mold 40 are spaced apart from each other at a predetermined distance, the second coupling member 62 stops the movement of the third mold 30 in the mold opening direction. As an ejector pin 35 moves in the mold closing direction in the state where the space is formed between the third mold 30 and the fourth mold 40, the product 901 is taken out of the mold for injection molding 100. Finally, the fifth mold 50 moves in the mold opening direction in relation to the first mold 10. When the fifth mold 50 and the first mold 10 are spaced apart from each other at a predetermined distance, the third coupling member 63 stops the movement of the fifth mold 50 in the mold opening direction. Thus, the support part 13 is accommodated inside the second penetration hole 52 in the fifth mold 50, and the runner 902 is taken out of the mold for injection molding 100.

Figure 6:
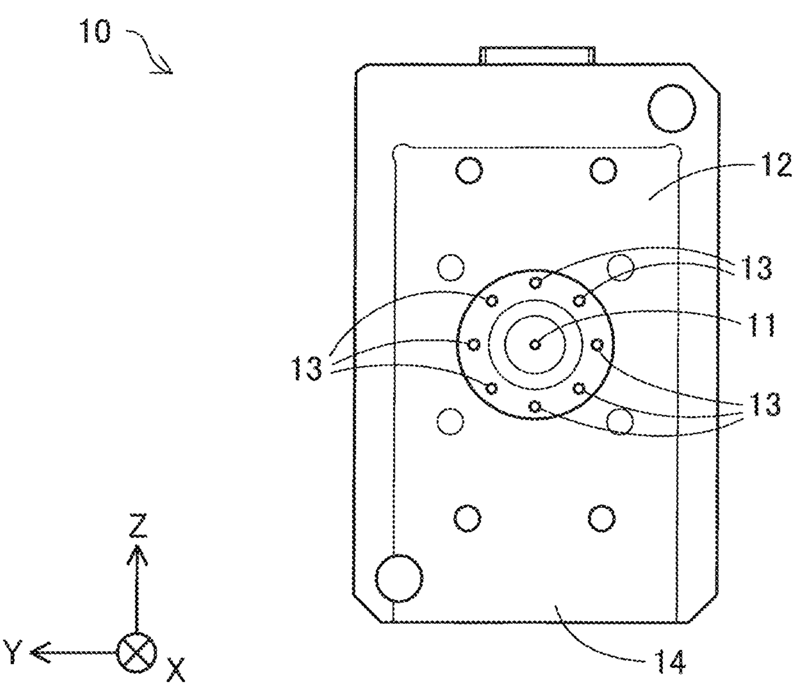
FIG. 6 is a side view of a surface of a first mold facing a second mold.

FIG. 6 is a side view of the surface of the first mold 10 facing the second mold 20. As shown in FIG. 6, the recess 12 is formed at the surface of the first mold 10 facing the second mold 20. At the surface of the first mold 10 facing the fourth mold 40, a groove 14 penetrating the mold downward in the vertical direction is formed below the gate opening 11. The groove 14 is formed below the recess 12. In this embodiment, the recess 12 and the groove 14 are formed as a unified part. However, the recess 12 and the groove 14 may be not formed as a unified part.

Figure 7:
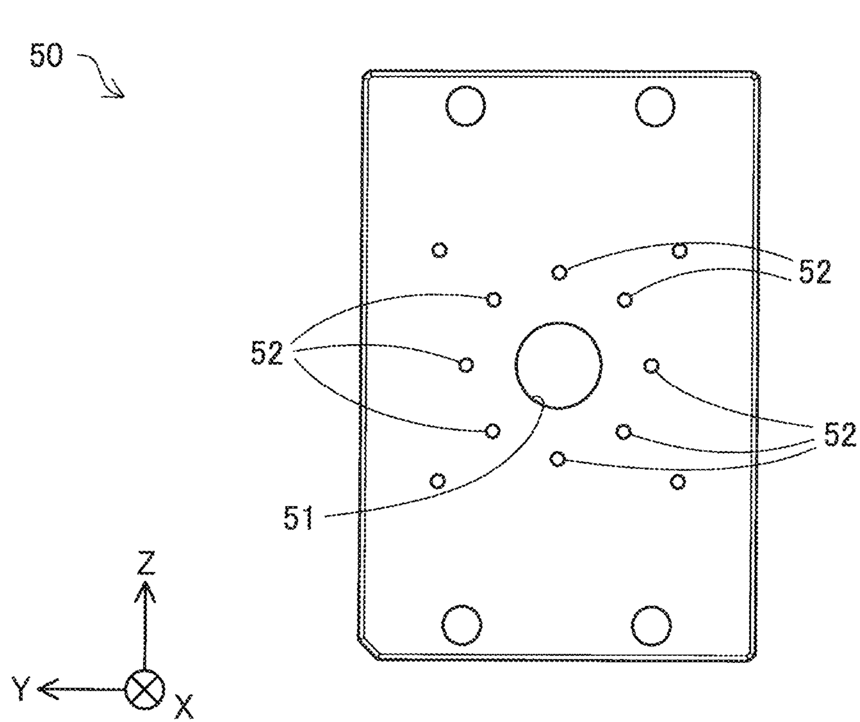
FIG. 7 is a side view of a surface of a fifth mold facing a fourth mold.
Figure 8:
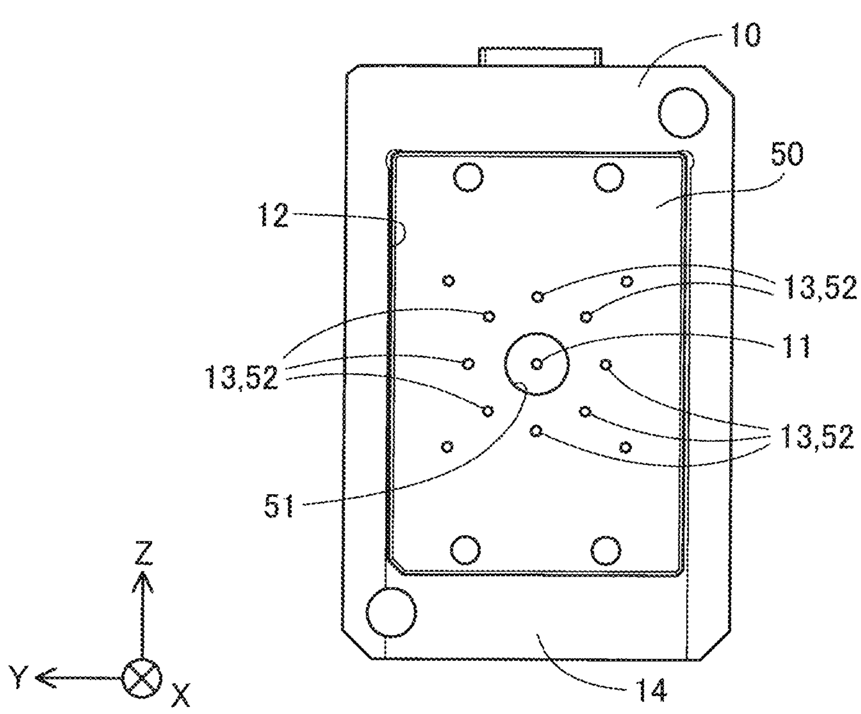
FIG. 8 is a side view of the first mold and the fifth mold in a state where the fifth mold is arranged in a recess in the first mold.

FIG. 7 is a side view of the surface of the fifth mold 50 facing the fourth mold 40. FIG. 8 is a side view of the first mold 10 and the fifth mold 50 in a state where the fifth mold 50 is arranged in the recess 12 in the first mold 10. The fifth mold 50 is arranged in the recess 12 when mold closing is performed.

Figure 9:
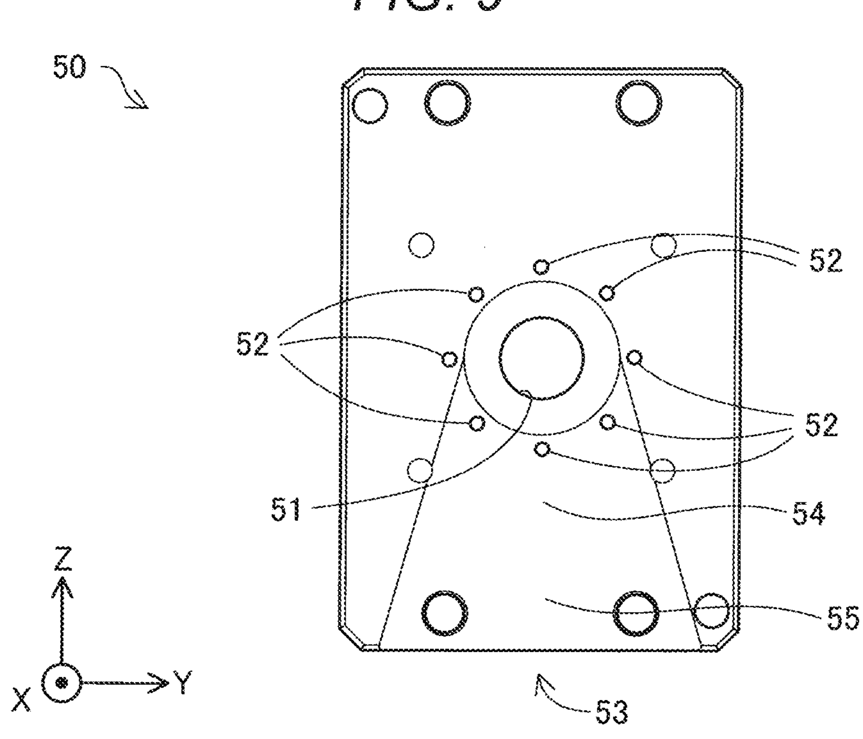
FIG. 9 is a side view of a surface of the fifth mold facing the first mold.

FIG. 9 is a side view of the surface of the fifth mold 50 facing the first mold 10. At the surface of the fifth mold 50 facing the first mold 10, a groove 53 penetrating the mold downward in the vertical direction from the first penetration hole 51 is formed. The groove 53 has a shape increasing in the width in the direction perpendicular to the vertical direction and the mold opening direction as it goes downward in the vertical direction. Specifically, the width of the groove 53 in the Y direction increases as it goes downward in the vertical direction. In the example shown in FIG. 9, the tapered groove 53 is formed at the surface of the fifth mold 50 facing the first mold 10. Also, the width of the groove 53 at the lowermost end in the vertical direction is smaller than the width of the fifth mold 50 in the direction perpendicular to the vertical direction and the mold opening direction. Specifically, the width of the groove 53 in the Y direction at the lowermost end in the vertical direction is smaller than the width of the fifth mold 50 in the Y direction. The groove 53 has a first part 54 and a second part 55. The second part 55 is a part located below the first part 54. As shown in FIGS. 3 and 4, the depth of the first part 54 in the mold opening direction is shallower than the depth of the second part 55 in the mold opening direction. Specifically, the depth of the first part 54 in the −X direction is shallower than the depth of the second part 55 in the −X direction.

Figure 10:
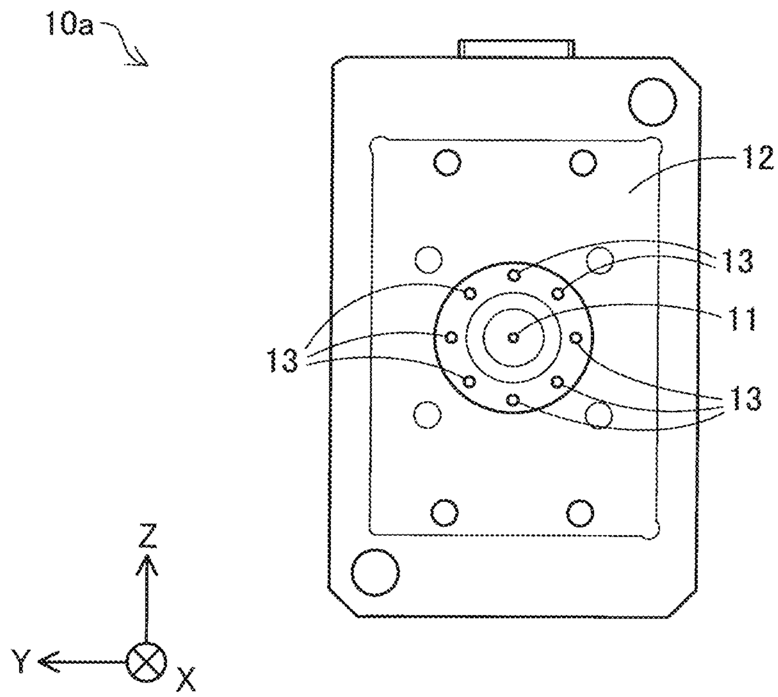
FIG. 10 shows an example of a first mold without having a groove formed at a surface facing the fourth mold.
Figure 11:
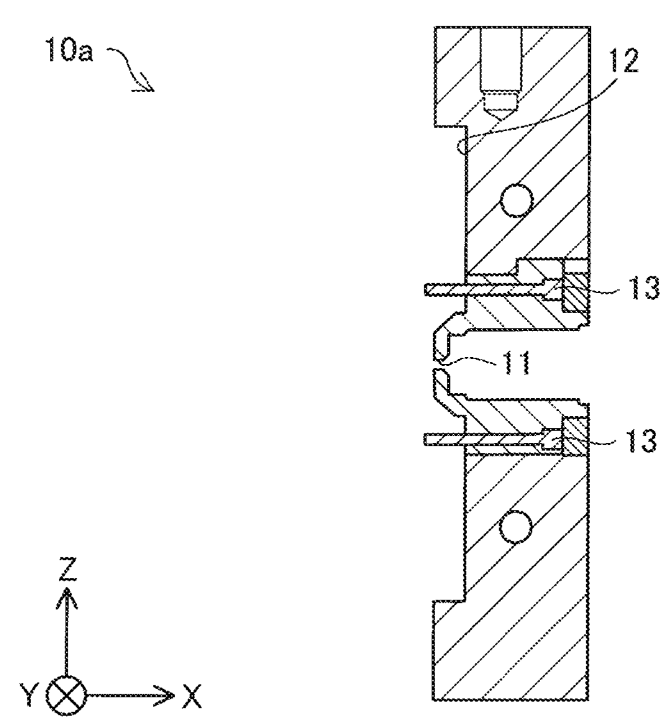
FIG. 11 shows an example of the first mold without having a groove formed at the surface facing the fourth mold.

In the mold for injection molding 100 according to the above-described first embodiment, at the surface of the first mold 10 facing the fourth mold 40, the groove 14 penetrating the mold downward in the vertical direction is formed. Therefore, the part of the first mold 10 where the groove 14 is formed and the fourth mold 40 are not in contact with each other in the state where the mold for injection molding 100 is closed. FIGS. 10 and 11 show an example of a first mold 10*a* without having the groove 14 at the surface facing the fourth mold 40. When the groove 14 is not formed in the first mold 10, if the used molding material or the like is attached to the surface facing the fourth mold 40 below the recess 12, the first mold 10 and the fourth mold 40 may not be accurately in contact with each other, causing a molding failure. When the groove 14 is formed as in the first mold 10 in this embodiment, even if the used molding material or the like is attached to the groove 14, the first mold 10 and the fourth mold 40 can be accurately brought into contact with each other. Thus, the probability that the used molding material or the like may be caught between the two molds can be reduced and the probability that a molding failure may occur can be reduced.

Also, in this embodiment, at the surface of the fifth mold 50 facing the first mold 10, the groove 53 penetrating the mold downward in the vertical direction is formed. Therefore, the part of the fifth mold 50 where the groove 53 is formed and the first mold 10 are not in contact with each other in the state where the mold for injection molding 100 is closed. Therefore, even if the used molding material or the like is attached to the groove 53, the first mold 10 and the fifth mold 50 can be accurately brought into contact with each other. Thus, the probability that the used molding material or the like may be caught between the first mold 10 and the fifth mold 50 can be reduced and the probability that a molding failure may occur can be reduced.

When the product 901 is molded using the mold for injection molding 100, the molding material passes through the first penetration hole 51 in the fifth mold 50 and therefore the used molding material can easily be attached to the part below the first penetration hole 51. In this embodiment, at the surface of the fifth mold 50 facing the first mold 10, the groove 53 penetrating the mold downward in the vertical direction from the first penetration hole 51 is formed. Therefore, the probability that the used molding material may be caught between the first mold 10 and the fifth mold 50 can be reduced even further.

When the product 901 is molded using the mold for injection molding 100, the molding material passes through the gate opening 11 in the first mold 10 and therefore the used molding material can easily be attached to the part below the gate opening 11. Also, when the groove 14 is not formed in the first mold 10, as shown in FIGS. 10 and 11, the used molding material or the like accumulated in the recess 12 can easily be caught between the first mold 10 and the fifth mold 50. In this embodiment, at the surface of the first mold 10 facing the fourth mold 40, the groove 14 penetrating the mold downward in the vertical direction is formed below the gate opening 11. Therefore, the probability that the used molding material may be caught between the first mold 10 and the fourth mold 40 can be reduced further. Also, the used molding material generated between the first mold 10 and the fifth mold 50 can easily fall down and the accumulation of the used molding material in the recess 12 can be suppressed. As a result, the probability that the used molding material may be caught between the first mold 10 and the fifth mold 50 can be reduced.

The used molding material tends to accumulate in a lower part of the mold. In this embodiment, the groove 53 formed at the surface of the fifth mold 50 facing the first mold 10 has a shape increasing in the width in the direction perpendicular to the vertical direction and the mold opening direction as it goes downward in the vertical direction. Therefore, the probability that the used molding material or the like may be caught between the first mold 10 and the fifth mold 50 can be reduced further. Also, since the contact area between the first mold 10 and the fifth mold 50 is larger than when the groove 53 is formed in the entire part below the first penetration hole 51, at the surface of the fifth mold 50 facing the first mold 10, a large area to receive the pressure applied to the first mold 10 and the fifth mold 50 in mold closing can be provided.

Also, in this embodiment, the width at the lowermost end in the vertical direction of the groove 53 formed at the surface of the fifth mold 50 facing the first mold 10 is smaller than the width of the fifth mold 50 in the direction perpendicular to the vertical direction and the mold opening direction. Therefore, a larger area to receive the pressure applied to the first mold 10 and the fifth mold 50 in mold closing can be provided than when the width of the groove 53 at the lowermost end in the vertical direction is equal to the width of the fifth mold 50 in the direction perpendicular to the vertical direction and the mold opening direction.

As described above, the used molding material tends to accumulate in a lower part of the mold. In this embodiment, since the groove 53 formed at the surface of the fifth mold 50 facing the first mold 10 has the first part 54 and the second part 55 located below the first part 54 and the depth of the second part 55 in the mold opening direction is deeper than the depth of the first part 54 in the mold opening direction, the probability that the used molding material or the like may be caught between the first mold 10 and the fifth mold 50 can be reduced further. Also, the thickness of the fifth mold 50 in the mold opening direction, at the part corresponding to the first part 54, can be prevented from being too thin.

B. Second Embodiment

Figure 12:
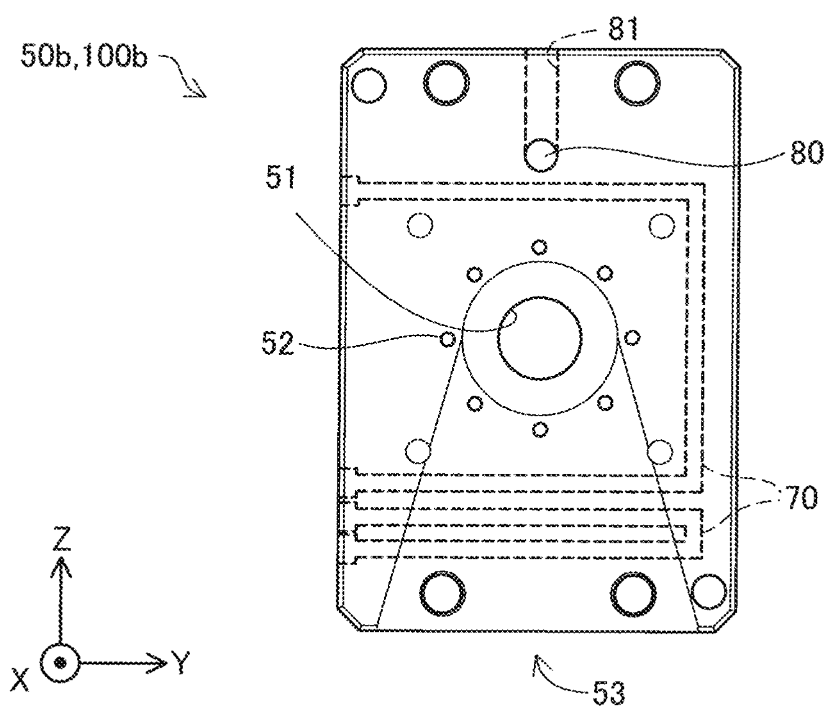
FIG. 12 is a side view of a surface of a fifth mold facing a first mold according to a second embodiment.

FIG. 12 is a side view of a surface of a fifth mold 50*b* facing the first mold 10 according to a second embodiment. In the second embodiment, the fifth mold 50*b* further includes a cooling part 70 and a vent 80. The configurations of the other parts of a mold for injection molding 100*b* than the fifth mold 50*b* are the same as those in the first embodiment.

The cooling part 70 cools the fifth mold 50*b*. In this embodiment, the cooling part 70 is a refrigerant flow path through which a refrigerant flows. The refrigerant is, for example, water. As the refrigerant flows through the refrigerant flow path, the fifth mold 50*b* is cooled. The cooling part 70 is provided in the fifth mold 50*b* in such a way that the cooling capacity for the part where the groove 53 is formed is higher than the cooling capacity for the part where the groove 53 is not formed. In this embodiment, the refrigerant flow path is provided more densely at the part where the groove 53 is formed than at the part where the groove 53 is not formed, as shown in FIG. 12. The cooling part 70 may be any form that can cool a mold where a groove is formed, and is not limited to the refrigerant flow path.

The vent 80 is a hole provided at a surface of the fifth mold 50*b* facing another mold. In this embodiment, the vent 80 is formed at the part where the groove 53 is not formed, of the surface of the fifth mold 50*b* facing the first mold 10. The vent 80 communicates with a hole 81 provided at the surface of an upper part of the fifth mold 50*b*. As air is supplied toward the vent 80 from the hole 81 provided at the surface of the upper part of the fifth mold 50*b* in the state where the mold for injection molding 100*b* is opened, the used molding material or the like attached to the surface of the fifth mold 50*b* facing the first mold 10 and the surface of the first mold 10 facing the fifth mold 50*b* is removed. The vent 80 may be provided at the part where the groove 53 is formed, of the surface of the fifth mold 50*b* facing the first mold 10. Also, the hole 81 may be provided at a bottom surface of the fifth mold 50*b* or at a side surface that does not face another mold, instead of the surface of the upper part of the fifth mold 50*b*.

In the above-described mold for injection molding 100*b* according to the second embodiment, the fifth mold 50*b* has the cooling part 70 provided in such a way that the cooling capacity for the part where the groove 53 is formed is higher than the cooling capacity for the part where the groove 53 is not formed. The part where the groove 53 is formed is a thermal insulation part where the first mold 10 and the fifth mold 50*b* are not in contact with each other. Therefore, the thermal insulation part can be cooled more than the part where the first mold 10 and the fifth mold 50*b* are in contact with each other.

Also, in this embodiment, the fifth mold 50*b* has the vent 80. As air blows out from the vent 80, the used molding material or the like attached to the surface of the fifth mold 50*b* facing the first mold 10 and the surface of the first mold 10 facing the fifth mold 50*b* can be easily removed. Therefore, the probability that the used molding material or the like may be caught between the first mold 10 and the fifth mold 50*b* can be reduced further.

C. Third Embodiment

Figures 13, 14:
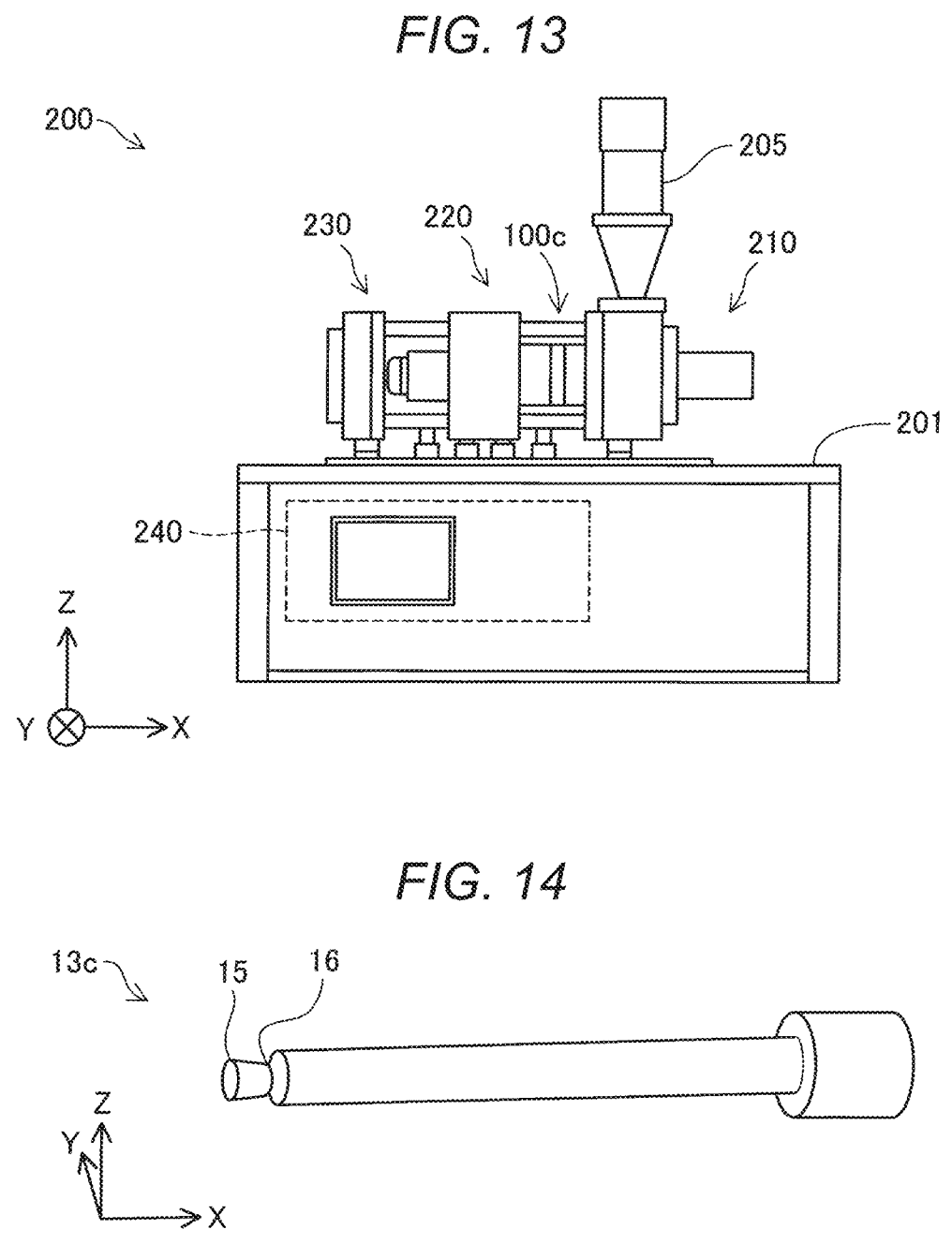

FIG. 13 illustrates a schematic configuration of an injection molding system 200 according to a third embodiment. The injection molding system 200 has a mold for injection molding 100*c*, an injection unit 210, a fixing unit 220, a mold closing unit 230, and a control unit 240. The injection unit 210, the fixing unit 220, and the mold closing unit 230 are fixed at the top of a base 201. The injection unit 210, the fixing unit 220, and the mold closing unit 230 are arrayed in the horizontal direction. The mold for injection molding 100*c* is installed at the fixing unit 220. The control unit 240 is accommodated in the base 201. The injection molding system 200 molds a product by injecting a molding material from the injection unit 210 to the mold for injection molding 100*c* installed at the fixing unit 220.

In the mold for injection molding 100*c* in this embodiment, the shape of a support part 13*c* of a first mold 10*c* is different from the shape of the support part 13 in the first embodiment and the second embodiment. The configurations of the other parts of the mold for injection molding 100*c* than the support part 13*c* are the same as those in the mold for injection molding 100 in the first embodiment or the mold for injection molding 100*b* in the second embodiment.

FIG. 14 is a perspective view of the support part 13*c* in the third embodiment. The support part 13*c* has a third part 15 and a fourth part 16. The third part 15 is a part with a cross-sectional area perpendicular to the mold opening direction having a first value. The fourth part 16 is a part with a cross-sectional area perpendicular to the mold opening direction having a second value smaller than the first value. The third part 15 is formed nearer to the distal end of the support part 13*c* than the fourth part 16. Specifically, the third part 15 is formed further in the −X direction than the fourth part 16. As the support part 13*c* has the third part 15 and the fourth part 16, the support part 13*c* is less likely to be detached from the runner 902 in mold opening than when the cross-sectional area perpendicular to the mold opening direction, of the support part 13*c*, is constant regardless of any position on the support part 13*c*.

The control unit 240 shown in FIG. 13 is configured with a computer having one or a plurality of processors, a memory, and an input-output interface that inputs and outputs a signal from and to outside. As the processor executes a program or a command read onto a main storage device, the control unit 240 achieves various functions such as a function of executing processing to mold a molded article. The control unit 240 may be implemented by a configuration in which a plurality of circuits to implement at least a part of the functions are combined together, instead of being configured with a computer.

A hopper 205 accommodating a material for a molded article is coupled to the injection unit 210. The injection unit 210 plasticizes at least part of the material supplied from the hopper 205, thus generates a molding material, and injects the molding material into a cavity Cv formed in the mold for injection molding 100*c*. The concept of "plasticizing"

includes melting and refers to changing a solid state to a fluid state. Specifically, in the case of a material in which glass transition occurs, plasticizing means raising the temperature of the material to the glass transition point or higher. In the case of a material in which glass transition does not occur, plasticizing means raising the temperature of the material to the melting point or higher. The supply of the material to the injection unit 210 is not limited to the supply from the hopper 205 but may be performed, for example, via a tube through which the material is pumped.

The hopper 205 accommodates a material in the form of pellets containing a metal powder and a binder. As the metal powder, a single metal of magnesium (Mg), iron (Fe), cobalt (Co), chromium (Cr), aluminum (Al), titanium (Ti), copper (Cu), and nickel (Ni), a powder containing two or more of these metals, or an alloy containing two or more of these metals is used. Examples of the above alloy include a maraging steel, a cobalt-chromium-molybdenum alloy, a titanium alloy, a nickel alloy, an aluminum alloy, a cobalt alloy, a cobalt-chromium alloy, and the like. The binder includes a resin and a wax. As the resin, an acrylic resin, an epoxy resin, a silicone resin, a cellulose-based resin or other synthetic resins, or a thermoplastic resin such as polylactic acid (PLA), polyamide (PA), polyphenylene sulfide (PPS), or polyetheretherketone (PEEK) is used.

Figure 15:
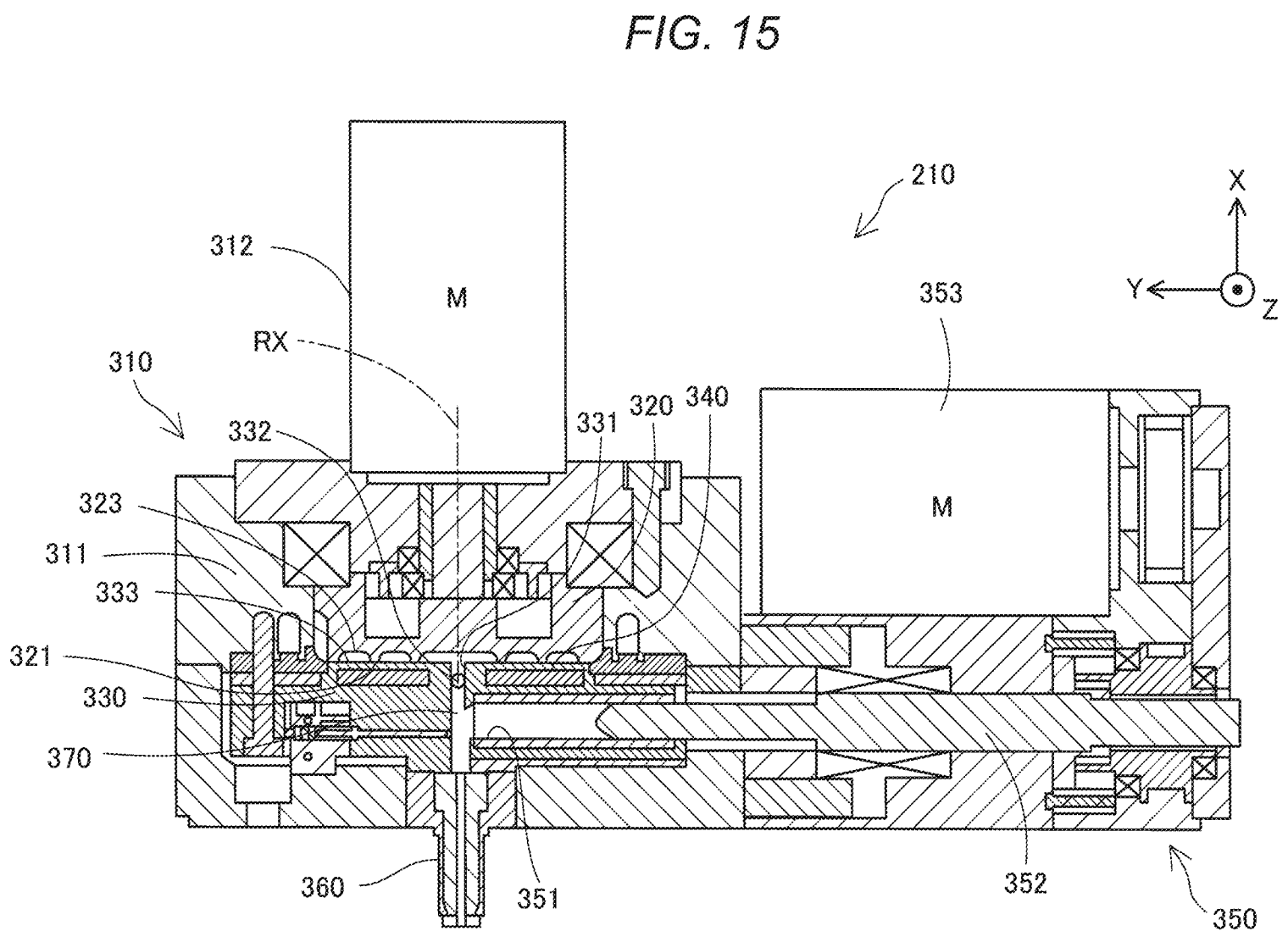

FIG. 15 is a cross-sectional view showing a schematic configuration of the injection unit 210. The injection unit 210 has a plasticizing unit 310, a suction feeding unit 350, and a nozzle 360.

The plasticizing unit 310 plasticizes at least a part of the material supplied from the hopper 205 and thus generates a molding material. The plasticizing unit 310 has a flat screw 320, a barrel 330, and a heater 340. The flat screw 320 is accommodated in a screw case 311. The flat screw 320 is referred to as a rotor or simply as a screw. The flat screw 320 is rotationally driven about an axis of rotation RX inside the screw case 311 by a drive motor 312. In this embodiment, the direction of the axis of rotation RX is along the X direction. A communication hole 331 is formed at the center of the barrel 330. The communication hole 331 forms at least a part of a flow path 370 through which the molding material flows. An injection cylinder 351, described later, coupled the is to communication hole 331. The communication hole 331 is provided with a check valve 332 upstream from the injection cylinder 351. The rotation of the flat screw 320 by the drive motor 312 and heating by the heater 340 are controlled by the control unit 240.

Figures 16, 17:
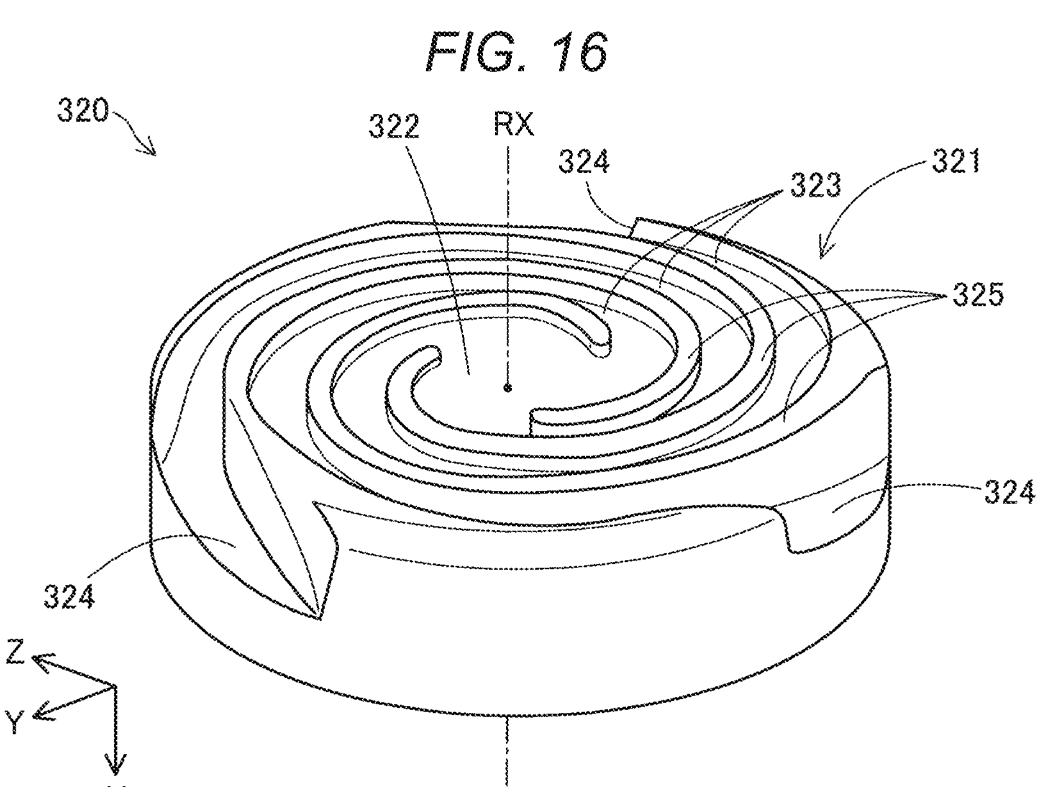
FIG. 16 is a perspective view showing a schematic configuration of a flat screw.
FIG. 17 is a schematic plan view of a barrel.

FIG. 16 is a perspective view showing a schematic configuration of the flat screw 320. The flat screw 320 has a substantially cylindrical shape having a height in a direction along the center axis thereof that is smaller than the diameter thereof. At a groove forming surface 321 facing the barrel 330, of the flat screw 320, a vortex-like groove 323 is formed about a center part 322. The groove 323 communicates with a material inlet 324 formed at a side surface of the flat screw 320. The material supplied from the hopper 205 is supplied to the groove 323 via the material inlet 324. The groove 323 is formed by being separated by a protruding part 325. While FIG. 16 shows an example where three grooves 323 are formed, the number of grooves 323 may be one or may be two or more. The groove 323 is not limited to the vortex shape and may be in the shape of a spiral or an involute curve or may have a shape extending in such a way as to form an arc from the center part 322 toward the outer circumference.

FIG. 17 is a schematic plan view of the barrel 330. The barrel 330 has an opposite surface 333 facing the groove forming surface 321 of the flat screw 320. The communication hole 331 is formed at the center of the opposite surface 333. At the opposite surface 333, a plurality of guide grooves 334 coupled to the communication hole 331 and extending in the shape of a vortex from the communication hole 331 toward the outer circumference are formed. The material supplied to the groove 323 of the flat screw 320 flows along the groove 323 and the guide grooves 334 due to the rotation of the flat screw 320 and is guided to the center part 322 of the flat screw 320, while being plasticized between the flat screw 320 and the barrel 330 due to the rotation of the flat screw 320 and the heating by the heater 340. The material flowing in the center part 322 flows out to the suction feeding unit 350 from the communication hole 331 formed at the center of the barrel 330. The barrel 330 may be not provided with the guide grooves 334. The guide grooves 334 may be not coupled to the communication hole 331.

As shown in FIG. 15, the suction feeding unit 350 has the injection cylinder 351, a plunger 352, and a plunger drive unit 353. The suction feeding unit 350 has a function of injecting the molding material in the injection cylinder 351 into the cavity Cv in the mold for injection molding 100*c*. The suction feeding unit 350 controls the amount of the molding material injected from the nozzle 360, the injection speed, and the injection pressure, under the control of the control unit 240. The injection cylinder 351 is a substantially cylindrical member coupled to the communication hole 331 of the barrel 330 and has the plunger 352 inside. The plunger 352 slides inside the injection cylinder 351 and pumps the molding material in the injection cylinder 351 to the nozzle 360 provided in the injection unit 210. Thus, the molding material is injected from the nozzle 360 to the mold for injection molding 100*c*. The plunger 352 is driven by the plunger drive unit 353 configured with a motor.

The nozzle 360 injects the molding material to the mold for injection molding 100*c*. The nozzle 360 is configured as an open-gate-type nozzle. The tip of the nozzle 360 is located inside the gate opening 11 in the mold for injection molding 100*c* installed at the fixing unit 220.

Figure 18:
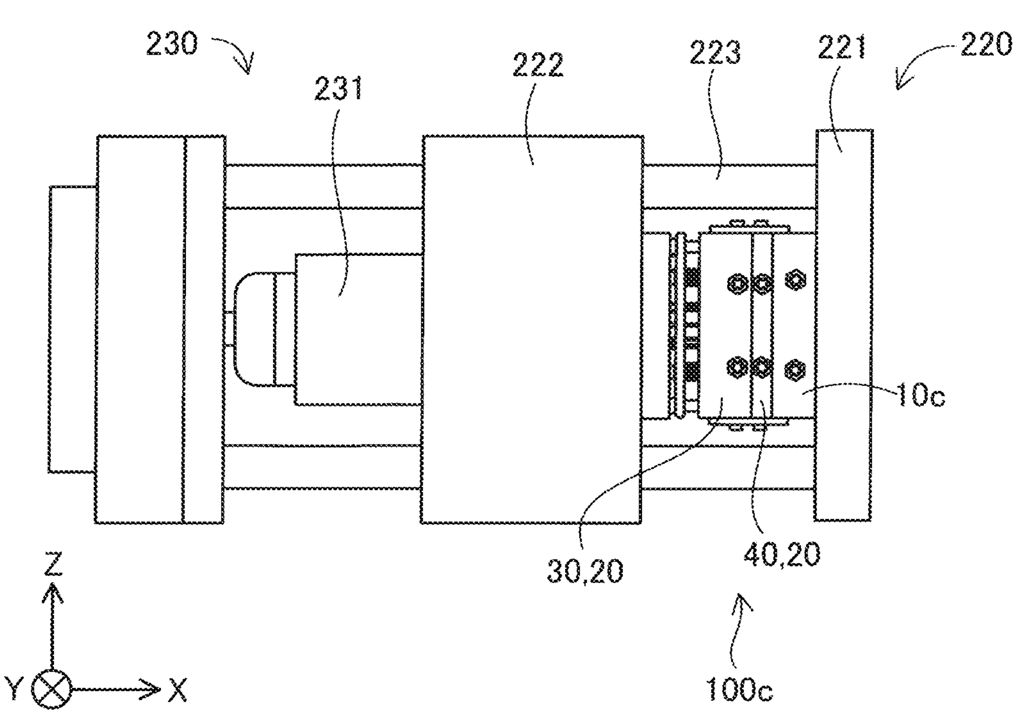
FIG. 18 illustrates a schematic configuration of a fixing unit and a mold closing unit.

FIG. 18 illustrates a schematic configuration of the fixing unit 220 and the mold closing unit 230. The fixing unit 220 is provided in such a way that the mold for injection molding 100*c* is attachable to and detachable from the fixing unit 220. The fixing unit 220 has a fixed plate 221 and a moving plate 222. The fixed plate 221 is fixed to one end of a tie bar 223 extending in the horizontal direction in such a way that the plate surface of the fixed plate is parallel to the vertical direction. The moving plate 222 is arranged facing the fixed plate 221 at the −X direction side of the fixed plate 221 in such a way that the plate surface of the moving plate is parallel to the vertical direction. The moving plate 222 is provided to be movable along the direction in which the tie bar 223 extends. The first mold 10*c* of the mold for injection molding 100*c* is installed at the fixed plate 221, and the third mold 30 of the mold for injection molding 100*c* is installed at the moving plate 222.

The mold closing unit 230 opens and closes the mold for injection molding 100*c* installed at the fixing unit 220. The mold closing unit 230 drives a motor, not illustrated, under the control of the control unit 240, thus causes a ball screw 231 to rotate, and causes the moving plate 222 coupled to the ball screw 231 to move along the tie bar 223. As the moving plate 222 moves along the tie bar 223, the mold for injection molding 100*c* installed at the fixing unit 220 is opened and closed. When the moving plate 222 moves in the +X direction, the second mold 20 moves in the direction toward the first mold 10*c* and the mold for injection molding 100*c* is closed. When the moving plate 222 moves in the –X direction, the second mold 20 moves in the direction away from the first mold 10*c* and the mold for injection molding 100*c* is opened.

In the above-described injection molding system 200 according to the third embodiment, the support part 13*c* of the first mold 10*c* has the third part 15 with a cross-sectional area perpendicular to the mold opening direction having a first value, and the fourth part 16 with a cross-sectional area perpendicular to the mold opening direction having a second value smaller than the first value, and the third part 15 is formed nearer to the distal end of the support part 13*c* than the fourth part 16. Therefore, the support part 13*c* is less likely to be detached from the runner 902 in mold opening than when the cross-sectional area perpendicular to the mold opening direction, of the support part 13*c*, is constant regardless of any position on the support part 13*c*, and the molding material tends to be scattered when the support part 13*c* is detached from the runner 902. In this embodiment, since the molding material contains a metal powder, the metal powder tends to be scattered when molding the product 901. The molding material and the metal powder, thus scattered, may become attached to the mold for injection molding 100*c* in some cases.

In this embodiment, as in the first embodiment, at the surface of the first mold 10*c* facing the fourth mold 40, the groove 14 penetrating the mold downward in the vertical direction is formed. Therefore, even when the scattered molding material or metal powder is attached to the groove 14, the first mold 10*c* and the fourth mold 40 can be accurately brought into contact with each other. Thus, the probability that the used molding material or the like may be caught between the first mold 10*c* and the fourth mold 40 can be reduced and the probability that a molding failure may occur can be reduced.

Also, in this embodiment, at the surface of the fifth mold 50 facing the first mold 10*c*, the groove 53 penetrating the mold downward in the vertical direction is formed. Therefore, even when the scattered molding material or metal powder is attached to the groove 53, the first mold 10*c* and the fifth mold 50 can be accurately brought into contact with each other. Thus, the probability that the used molding material or the like may be caught between the first mold 10*c* and the fifth mold 50 can be reduced and the probability that a molding failure may occur can be reduced.

Also, in this embodiment, since the nozzle 360 is an open-gate-type nozzle, even when the injection of the molding material from the nozzle 360 is stopped in the state where the mold for injection molding 100*c* is opened, the molding material may drip on the mold for injection molding 100*c* from the tip of the nozzle 360 in some cases. In this embodiment, the groove 14 penetrating the mold downward in the vertical direction is formed at the surface of the first mold 10*c* facing the fourth mold 40, and the groove 53 penetrating the mold downward in the vertical direction is formed at the surface of the fifth mold 50 facing the first mold 10*c*. Therefore, even when the molding material drips between the first mold 10*c* and the fifth mold 50 from the tip of the nozzle 360, the molding material that has dripped can easily drop below the first mold 10*c* and the fifth mold 50 and is less likely to accumulate between the first mold 10*c* and the fifth mold 50. Thus, the probability that the molding material dripping from the nozzle 360 may be caught between the first mold 10*c* and the fifth mold 50 can be reduced and the probability that a molding failure may occur can be reduced.

D. Fourth Embodiment

Figure 19:
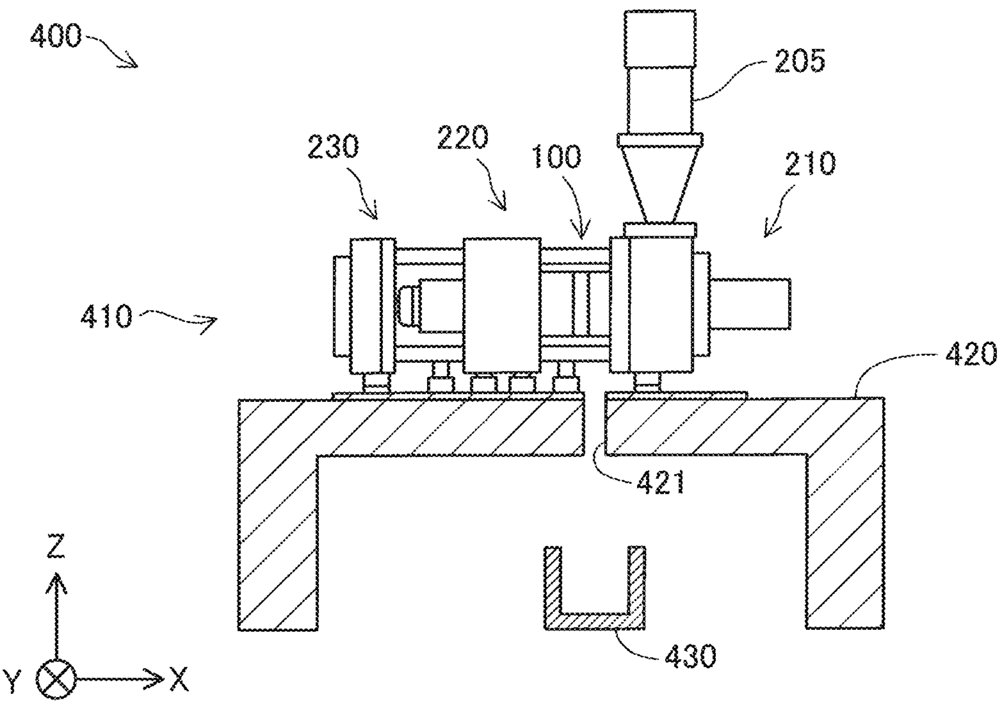
FIG. 19 illustrates a schematic configuration of an injection molding system according to a fourth embodiment.

FIG. 19 illustrates a schematic configuration of an injection molding system 400 according to a fourth embodiment. The injection molding system 400 has an injection molding device 410, a pedestal 420, and an accommodation unit 430. The injection molding device 410 is installed at the pedestal 420. The accommodation unit 430 is arranged below the injection molding device 410 and the pedestal 420.

The injection molding device 410 has a mold for injection molding 100, an injection unit 210, a fixing unit 220, a mold closing unit 230, and a control unit 240, not illustrated. The configuration of the mold for injection molding 100 in the fourth embodiment is the same as the mold for injection molding 100 in the first embodiment. The configuration of the mold for injection molding 100 in the fourth embodiment may be the same as that of the mold for injection molding 100*b* in the second embodiment or the mold for injection molding 100*c* in the third embodiment. The configurations of the injection unit 210, the fixing unit 220, the mold closing unit 230, and the control unit 240 are the same as those in the third embodiment. In this embodiment the nozzle 360 provided in the injection unit 210 may be a valve-gate-type nozzle instead of an open-gate-type nozzle.

In the pedestal 420, a disposal hole 421 is formed at a position corresponding to a part below the groove 14 formed in the first mold 10 and the groove 53 formed in the fifth mold 50 of the mold for injection molding 100 installed in the injection molding device 410. The disposal hole 421 is a hole penetrating the pedestal 420 in the vertical direction. The disposal hole 421 is formed in the pedestal 420 in such a way as to lead to the accommodation unit 430.

The accommodation unit 430 accommodates the molding material which is disposed of. The accommodation unit 430 is in the shape of a box having an opening at the top and is arranged below the disposal hole 421. The accommodation unit 430 accommodates the used molding material or the like caught between the first mold 10 and the fifth mold 50 and the molding material or the like dripping from the tip of the nozzle 360. The accommodation unit 430 may be a magnet pad, a magnet sheet or the like, or may be a suction pump or the like. Also, the accommodation unit 430 may be arranged in the pedestal 420 without having the disposal hole 421 formed in the pedestal 420.

In the above-described injection molding system 400 according to the fourth embodiment, the disposal hole 421 is formed in the pedestal 420, below the groove 14 and the groove 53 formed in the mold for injection molding 100, and the accommodation unit 430 is arranged below the disposal hole 421. Therefore, the molding material that has dropped below from the groove 14 or the groove 53 can be easily collected.

E. Other Embodiments (E-1) In the above embodiments, the groove 14 penetrating the mold downward in the vertical direction is formed at the surface of the first mold 10 facing the fourth mold 40. Also, the groove 53 penetrating the mold downward in the vertical direction is formed at the surface of the fifth mold 50 facing the first mold 10. However, a groove penetrating the mold downward in the vertical direction may be formed at least at one of an opposite surface of at least one of the third mold 30 and the fourth mold 40, an opposite surface of at least one of the fourth mold 40 and the fifth mold 50, an opposite surface of at least one of the fifth mold 50 and the first mold 10, and an opposite surface of at least one of the fourth mold 40 and the first mold 10.

(E-2) In the above embodiments, the groove 53 penetrating the mold downward in the vertical direction from the first penetration hole 51 is formed at the surface of the fifth mold 50 facing the first mold 10. However, at the surface of the fifth mold 50 facing the first mold 10, a groove penetrating the mold upward in the vertical direction from the first penetration hole 51 and forming a symmetrical pair with the groove 53 with respect to the first penetration hole 51 may be formed in addition to the groove 53.

(E-3) In the above embodiments, the groove 53 formed in the fifth mold 50 has a shape increasing in the width in the direction perpendicular to the vertical direction and the mold opening direction as it goes downward in the vertical direction. However, the width of the groove 53 in the direction perpendicular to the vertical direction and the mold opening direction may not change as it goes downward in the vertical direction.

(E-4) In the above embodiments, the width of the groove 53 at the lowermost end in the vertical direction is smaller than the width of the fifth mold 50 in the direction perpendicular to the vertical direction and the mold opening direction. However, the width of the groove 53 at the lowermost end in the vertical direction may be equal to the width of the fifth mold 50 in the direction perpendicular to the vertical direction and the mold opening direction.

(E-5) In the above embodiments, the groove 53 has the first part 54 and the second part 55, and the depth of the first part 54 in the mold opening direction is shallower than the depth of the second part 55 in the mold opening direction. However, the depth of the first part 54 in the mold opening direction and the depth of the second part 55 in the mold opening direction may be equal to each other. That is, the depth of the groove 53 in the mold opening direction may be constant regardless of any position.

(E-6) In the above embodiments, the groove 53 has a shape increasing in the width in the direction perpendicular to the vertical direction and the mold opening direction as it goes downward in the vertical direction. Also, the width of the groove 53 at the lowermost end in the vertical direction is smaller than the width of the fifth mold 50 in the direction perpendicular to the vertical direction and the mold opening direction. Also, the groove 53 has the first part 54 and the second part 55, and the depth of the first part 54 in the mold opening direction is shallower than the depth of the second part 55 in the mold opening direction. However, these features are not limited to groove 53, and a groove formed at the surface of the first mold 10 facing the fifth mold 50, the surface of the first mold 10 facing the fourth mold 40, the surface of the fourth mold 40 facing the first mold 10, the surface of the third mold 30 facing the fourth mold 40, the surface of the fourth mold 40 facing the third mold 30, the surface of the fourth mold 40 facing the fifth mold 50, or the surface of the fifth mold 50 facing the fourth mold 40 may have the foregoing features.

(E-7) In the first embodiment, the cross-sectional area of the support part 13 in the direction perpendicular to the mold opening direction is constant regardless of any position on the support part 13. However, the support part 13 in the first embodiment may have the same configuration as the support part 13*c* in the third embodiment.

(E-8) In the second embodiment, the cooling part 70 is provided in the fifth mold 50. However, the cooling part 70 is not limited to being provided in the fifth mold 50 and may be provided in any mold in which a groove penetrating the groove downward in the vertical direction is formed.

F. Other Aspects

The present disclosure is not limited to the foregoing embodiments and can be implemented according to various aspects without departing from the spirit and scope of the present disclosure. For example, the present disclosure can be implemented according to the aspects described below. A technical feature in the foregoing embodiments corresponding to a technical feature in the aspects described below can be replaced or combined where appropriate in order to solve a part or all of the problems of the present disclosure or in order to achieve a part or all of the effects of the present disclosure. The technical feature can be deleted where appropriate, unless described as essential in the present specification.

(1) According to an aspect of the present disclosure, a mold for injection molding is provided. This mold for injection molding is a mold for injection molding which has a plurality of molds and in which a cavity prescribing a shape of a product is formed, the mold for injection molding including: a first mold where a gate opening through which a molding material flows in is formed; and a second mold that moves due to mold opening in a mold opening direction which is a direction away from the first mold and perpendicular to a vertical direction, wherein the second mold includes a third mold, a fourth mold arranged between the third mold and the first mold in the mold opening direction, and a fifth mold arranged between the fourth mold and the first mold in the mold opening direction, the third mold and the fourth mold forming the cavity, the fourth mold having a passage through which the molding material passes from the gate opening toward the cavity, the fifth mold having a first penetration hole through which the molding material passes from the gate opening toward the passage, the first mold has a recess at a surface facing the second mold, the fifth mold is arranged in the recess when mold closing is performed, a space is formed between the third mold and the fourth mold, between the fourth mold and the fifth mold, between the fifth mold and the first mold, and between the fourth mold and the first mold in the mold opening direction by the mold opening, and a groove penetrating the mold downward in the vertical direction is formed at least at one of an opposite surface of at least one of the third mold and the fourth mold, an opposite surface of at least one of the fourth mold and the fifth mold, an opposite surface of at least one of the fifth mold and the first mold, and an opposite surface of at least one of the fourth mold and the first mold.

According to such an aspect, even when the used molding material or the like is attached to the groove, the mold in which the groove is formed and the mold having a surface facing the surface where the groove is formed can be accurately brought into contact with each other. Thus, the probability that the used molding material or the like may be caught between the two molds can be reduced and the probability that a molding failure may occur can be reduced.

(2) In the above aspect, at the surface of the fifth mold facing the first mold, the groove penetrating the mold downward in the vertical direction from the first penetration hole may be formed.

According to such an aspect, the first mold and the fifth mold can be accurately brought into contact with each other. Thus, the probability that the used molding material or the like may be caught between the first mold and the fifth mold can be reduced and the probability that a molding failure may occur can be reduced.

(3) In above aspect, at the surface of the first mold facing the fourth mold, the groove penetrating the mold downward in the vertical direction may be formed below the gate opening.

According to such an aspect, the first mold and the fourth mold can be accurately brought into contact with each other. Thus, the probability that the used molding material or the like may be caught between the first mold and the fourth mold can be reduced and the probability that a molding failure may occur can be reduced.

(4) In the above aspect, the groove may have a shape increasing in width in a direction perpendicular to the vertical direction and the mold opening direction as it goes downward in the vertical direction.

According to such an aspect, a large area to receive the pressure applied between the mold in which the groove is formed and the mold having a surface facing the surface where the groove is formed, when the mold for injection molding is closed, can be provided.

(5) In the above aspect, the width of the groove at a lowermost end in the vertical direction may be smaller than a width in a direction perpendicular to the vertical direction and the mold opening direction, of the mold in which the groove is formed.

According to such an aspect, a larger area to receive the pressure applied between the mold in which the groove is formed and the mold having a surface facing the surface where the groove is formed, when the mold for injection molding is closed, can be provided than when the width of the groove at the lowermost end in the vertical direction is equal to the width in the direction perpendicular to the vertical direction and the mold opening direction, of the mold in which the groove is formed.

(6) In the above aspect, the groove may have a first part and a second part located below the first part, and a depth of the first part in the mold opening direction may be shallower than a depth of the second part in the mold opening direction.

The used molding material or the like tends to accumulate in a lower part of the mold. According to such an aspect, since the depth of the second part in the mold opening direction is deeper than the depth of the first part in the mold opening direction, the probability that the used molding material or the like may be caught between the two molds can be reduced further. Also, the thickness in the mold opening direction, of the part corresponding to the first part, can be prevented from being too thin.

(7) In the above aspect, the mold in which the groove is formed may have a cooling part that cools the mold in which the groove is formed, and a cooling capacity of the cooling part for a part where the groove is formed may be higher than the cooling capacity of the cooling part for a part where the groove is not formed.

According to such an aspect, the part where the groove is formed can be cooled more than the part where the groove is not formed.

(8) In the above aspect, a vent may be provided at least at one of the opposite surface of at least one of the third mold and the fourth mold, the opposite surface of at least one of the fourth mold and the fifth mold, the opposite surface of at least one of the fifth mold and the first mold, and the opposite surface of at least one of the fourth mold and the first mold.

According to such an aspect, as air blows out from the vent, the used molding material or the like attached to the opposite surfaces of the third mold and the fourth mold, the opposite surfaces of the fourth mold and the fifth mold, the opposite surfaces of the fifth mold and the first mold, or the opposite surfaces of the fourth mold and the first mold can be easily removed. Therefore, the probability that the used molding material or the like may be caught between the two molds can be reduced.

(9) According to another aspect of the present disclosure, an injection molding system is provided. This injection molding system is an injection molding system including the mold for injection molding according to the above aspect and an open-gate-type nozzle that ejects the molding material, wherein the molding material includes a metal powder, the fifth mold has a second penetration hole communicating with the passage, the first mold has a support part that is inserted in the second penetration hole and that supports the molding material filling an inside of the passage, and the support part has a third part with a cross-sectional area perpendicular to the mold opening direction having a first value and a fourth part with the cross-sectional area having a second value smaller than the first value, the third part being formed nearer to a distal end than the fourth part.

According to such an aspect, even when the used molding material or scattered metal powder or the like is attached to the groove, the mold in which the groove is formed and the mold having a surface facing the surface where the groove is formed can be accurately brought into contact with each other. Also, even when the molding material drips on the mold for injection molding from the nozzle, the molding material that has dripped is less likely to accumulate between the mold in which the groove is formed and the mold having the surface facing the surface where the groove is formed. Therefore, the probability that the used molding material or the like may be caught between the two molds can be reduced and the probability that a molding failure may occur can be reduced.

(10) According to still another aspect of the present disclosure, an injection molding system is provided. This injection molding system includes: an injection molding device having the mold for injection molding according to the above aspect and a nozzle that ejects the molding material; a pedestal where the injection molding device is installed; and an accommodation unit arranged below the pedestal and accommodating the molding material which is disposed of, and a disposal hole leading to the accommodation unit is formed in the pedestal, at a position corresponding to a position below the groove.

According to such an aspect, the used molding material or the like that has dropped from the groove can be easily collected.

What is claimed is:

1. A mold for injection molding which has a plurality of molds and in which a cavity prescribing a shape of a product is formed, the mold for injection molding comprising:

a first mold where a gate opening through which a molding material flows in is formed; and a second mold that moves due to mold opening in a mold opening direction which is a direction away from the first mold and perpendicular to a vertical direction, wherein the second mold includes a third mold, a fourth mold arranged between the third mold and the first mold in the mold opening direction, and a fifth mold arranged between the fourth mold and the first mold in the mold opening direction, the third mold and the fourth mold forming the cavity, the fourth mold having a passage through which the molding material passes from the gate opening toward the cavity, the fifth mold having a first penetration hole through which the molding material passes from the gate opening toward the passage, the first mold has a recess at a surface facing the second mold, the fifth mold is arranged in the recess when mold closing is performed, a space is formed between the third mold and the fourth mold, between the fourth mold and the fifth mold, between the fifth mold and the first mold, and between the fourth mold and the first mold in the mold opening direction by the mold opening, and a groove penetrating the mold downward in the vertical direction is formed at least at one of an opposite surface of at least one of the third mold and the fourth mold, an opposite surface of at least one of the fourth mold and the fifth mold, an opposite surface of at least one of the fifth mold and the first mold, and an opposite surface of at least one of the fourth mold and the first mold, wherein the groove has a shape increasing in width in a direction perpendicular to the vertical direction and the mold opening direction as it goes downward in the vertical direction, and the groove has a first part, and a second part located below the first part, and a depth of the first part in the mold opening direction is shallower than a depth of the second part in the mold opening direction.

2. The mold for injection molding according to claim 1, wherein at the surface of the fifth mold facing the first mold, the groove penetrating the mold downward in the vertical direction from the first penetration hole is formed.

3. The mold for injection molding according to claim 2, wherein at the surface of the first mold facing the fourth mold, the groove penetrating the mold downward in the vertical direction is formed below the gate opening.

4. The mold for injection molding according to claim 1, wherein the width of the groove at a lowermost end in the vertical direction is smaller than a width in a direction perpendicular to the vertical direction and the mold opening direction, of the mold in which the groove is formed.

5. The mold for injection molding according to claim 1, wherein the mold in which the groove is formed has a cooling part that cools the mold in which the groove is formed, and a cooling capacity of the cooling part for a part where the groove is formed is higher than a cooling capacity of the cooling part for a part where the groove is not formed.

6. The mold for injection molding according to claim 1, further comprising:

a vent at least at one of the opposite surface of at least one of the third mold and the fourth mold, the opposite surface of at least one of the fourth mold and the fifth mold, the opposite surface of at least one of the fifth mold and the first mold, and the opposite surface of at least one of the fourth mold and the first mold.

7. An injection molding system comprising the mold for injection molding according to claim 1 and an open-gate-type nozzle that ejects the molding material, wherein the molding material includes a metal powder, the fifth mold has a second penetration hole communicating with the passage, the first mold has a support part that is inserted in the second penetration hole and that supports the molding material filling an inside of the passage, and the support part has a third part with a cross-sectional area perpendicular to the mold opening direction having a first value and a fourth part with the cross-sectional area having a second value smaller than the first value, the third part being formed nearer to a distal end of the support part than the fourth part.

8. An injection molding system comprising:

an injection molding device having the mold for injection molding according to claim 1 and a nozzle that ejects the molding material;

a pedestal where the injection molding device is installed; and an accommodation unit arranged below the pedestal and accommodating the molding material which is disposed of, wherein a disposal hole leading to the accommodation unit is formed in the pedestal, at a position corresponding to a position below the groove.

* * * * *